United States Patent
Borah et al.

(10) Patent No.: US 10,944,655 B2
(45) Date of Patent: Mar. 9, 2021

(54) DATA VERIFICATION BASED UPGRADES IN TIME SERIES SYSTEM

(71) Applicant: AppDynamics LLC, San Francisco, CA (US)

(72) Inventors: Gautam Borah, Fremont, CA (US); Pankaj Gupta, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 710 days.

(21) Appl. No.: 14/611,003

(22) Filed: Jan. 30, 2015

(65) Prior Publication Data

US 2016/0036665 A1 Feb. 4, 2016

Related U.S. Application Data

(63) Continuation-in-part of application No. 14/448,977, filed on Jul. 31, 2014, now abandoned.

(51) Int. Cl.
*G06Q 30/00* (2012.01)
*H04L 12/26* (2006.01)
(Continued)

(52) U.S. Cl.
CPC .......... *H04L 43/065* (2013.01); *G06F 11/302* (2013.01); *G06F 11/3006* (2013.01);
(Continued)

(58) Field of Classification Search
CPC ........... G06Q 30/0255; G06Q 30/0235; G06Q 10/105; G06Q 10/103; G06Q 10/067;
(Continued)

(56) References Cited

U.S. PATENT DOCUMENTS 6,839,680 B1 *  1/2005  Liu .................... G06Q 30/0204
                                                          705/7.33
2003/0097564 A1 *  5/2003  Tewari .................... H04L 12/14
                                                          713/171

(Continued)

OTHER PUBLICATIONS

Kilic, et al. Quality of Service Aware Dynamic Admission Control IN IEEE 802.16 J Non-Transparent Relay Networks; Thesis: Master of Science in Computer Engineering Department, Middle East Technical University, Feb. 2010 (Year: 2010).*

(Continued)

*Primary Examiner* — Patricia H Munson
*Assistant Examiner* — Uche Byrd
(74) *Attorney, Agent, or Firm* — Behmke Innovation Group LLC; James M. Behmke; James J. Wong (57) ABSTRACT

A time series system is updated using a data-verification system. The aggregation system may include one or more aggregators. When an upgrade is appropriate, a shadow aggregator may be added to the set of active aggregators. Metrics are provided from one or more collectors to an active aggregator. The shadow aggregator may receive the metrics intended for a particular aggregator, process the metric, and then pass the metric to the intended aggregator for processing. After a period of time, the shadow aggregator data is verified against the intended aggregator data. If the shadow aggregator data is verified, the shadow aggregator becomes an active aggregator and processes data as normal.

14 Claims, 8 Drawing Sheets

(51) Int. Cl.
*G06F 11/30* (2006.01)
*G06F 11/34* (2006.01)
*H04L 12/24* (2006.01)

(52) U.S. Cl.
CPC ...... *G06F 11/3082* (2013.01); *G06F 11/3409* (2013.01); *G06F 11/3495* (2013.01); *H04L 43/04* (2013.01); *G06F 2201/875* (2013.01); *H04L 41/046* (2013.01)

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| 2006/0173878 | A1* | 8/2006 | Bley | G06F 16/258 |
| 2009/0216910 | A1* | 8/2009 | Duchesneau | G06F 9/5072 709/250 |
| 2012/0026393 | A1* | 2/2012 | Petrovic | H04H 20/14 348/462 |
| 2013/0198376 | A1* | 8/2013 | Landa | G06Q 10/04 709/224 |
| 2015/0215236 | A1* | 7/2015 | Joshi | H04L 47/806 707/754 |
| 2015/0309882 | A1* | 10/2015 | Harrison | G06F 11/2094 714/6.23 |

OTHER PUBLICATIONS

U.S. Appl. No. 14/448,977, Gautam Borah, Collection and Aggregation of Large Volume of Metrics, filed Jul. 31, 2014.
U.S. Appl. No. 14/449,065, Gautam Borah, Efficient Aggregation, Storage and Querying of Large Volume Metrics, filed Jul. 31, 2014.
U.S. Appl. No. 14/530,454, Gautam Borah, Rolling Upgrade of Metric Collection and Aggregation System, filed Oct. 31, 2014.

* cited by examiner

DATA VERIFICATION BASED UPGRADES IN TIME SERIES SYSTEM

CROSS-REFERENCE TO RELATED APPLICATIONS

This application is a continuation-in-part and claims the priority benefit of U.S. patent application Ser. No. 14/448,977, titled "Collection and Aggregation of Large Volume of Metrics," filed Jul. 31, 2014, the disclosure of which is incorporated herein by reference.

BACKGROUND OF THE INVENTION

The World Wide Web has expanded to make various services available to the consumer as online web applications. A multi-tiered web application is comprised of several internal or external services working together to provide a business solution. These services are distributed over several machines or nodes, creating an n-tiered, clustered on-demand business application. The performance of a business transaction is determined by the execution time of a business transaction. For Example, reserving a flight ticket involves a typical business transaction "checkout" which involves shopping-cart management, calling invoicing and billing system, and so on, involving several services hosted by the application on multiple server machines or nodes. It is essential to monitor and measure a business application to provide insight regarding bottlenecks in communication, communication failures and other information regarding business transaction performance.

A business application can be monitored by collecting several metrics from each server machine or node in the system. The collected metrics are aggregated by service or tier level and then aggregated again at the application level. The metric processing involves aggregation of hierarchical metrics by several levels for an n-tier business application. In a large business application environment, hundreds and thousands of server machines or nodes create multiple services or tiers, with each of these nodes generating millions of metrics per minute. When portions of the aggregator need to be upgraded, the system is typically brought down or restarted in order to add the new aggregation portion. This can be costly as data that would normally be collected and aggregated during the time the system was down or restarted would be lost.

There is a need for a system that can process millions of metrics per minute in real time, aggregate the metrics and upgrade aggregation portions of the system with minimal data loss.

SUMMARY OF THE CLAIMED INVENTION

The present technology processes a large volume of real time hierarchical system metrics using distributed computing. The metrics processing system receives different types of hierarchical metrics coming from different sources and then aggregates the metrics by their hierarchy. The system is on-demand, cloud based, multi-tenant and highly available. The system makes the aggregated metrics available for reporting and policy triggers in real time.

The metrics aggregation system may be upgraded using a data-verification system. The verification service could read data from both active and shadow storage and verify the live data at real time. When an upgrade is appropriate, a shadow aggregator may be added to the set of active aggregators. Metrics are provided from one or more collectors to an active aggregator. The shadow aggregator may receive the metrics intended for a particular aggregator, process the metric, and then pass the metric to the intended aggregator for processing. After a period of time, the shadow aggregator data is verified against the intended aggregator data. If the shadow aggregator data is verified, the SHADOW aggregator state is changed to from shadow to active and processes data as normal.

An embodiment may include a method for performing data verification based upgrades to a data aggregation system. Time series payload data may be processed and stored by a new aggregator and a group of aggregators, wherein a selected aggregator of the group of aggregators processes each payload that is processed by the new aggregator. A verification of the data stored by the new aggregator and the data stored by the selected aggregator may be performed. A processing state of the new aggregator may be modified based on the verification.

An embodiment may include a system for monitoring a business transaction. The system may include a processor, a memory and one or more modules stored in memory and executable by the processor. When executed, the one or more modules may process and store time series payload data by a new aggregator and a group of aggregators, wherein a selected aggregator of the group of aggregators process each payload that is processed by the new aggregator, perform a verification of the data stored by the new aggregator and the data stored by the selected aggregator, and modify a processing state of the new aggregator based on the verification.

DETAILED DESCRIPTION

The present technology processes a large volume of real time hierarchical system metrics using distributed computing by stateless processes. The metrics processing system receives different types of hierarchical metrics coming from different sources and then aggregates the metrics by their hierarchy. The system is on-demand, cloud based, multi-tenant and highly available. The system makes the aggregated metrics available for reporting and policy triggers in real time.

The metrics aggregation system may be upgraded using a data-verification system. The aggregation system may include one or more aggregators. When an upgrade is appropriate, a shadow aggregator may be added to the set of active aggregators. Metrics are provided from one or more collectors to an active aggregator. The shadow aggregator may receive the metrics intended for a particular aggregator, process the metric, and then pass the metric to the intended aggregator for processing. After a period of time, the shadow aggregator data is verified against the intended aggregator data. If the shadow aggregator data is verified, the shadow aggregator becomes an active aggregator and processes data as normal.

The metrics processing system organizes the set of aggregator processes in a consistent hash ring. This ring is available to the set of collectors through a quorum, such as for example through a ZooKeeper based quorum. The collectors receive metric chunks from several sources, and based on a hashing mechanism routes each metric to its destination aggregator for aggregation. Whenever a new aggregator is added to the system, the quorum immediately adds the new node to the existing consistent hash ring. The new node will start processing a portion of the consistent hash ring, that is a set of metrics will be routed to the new node for aggregation.

The mechanism described above is used to bring a new aggregator node into the processing set of aggregators. This same mechanism is being used to bring a new aggregator node with new software version to the processing set. Here is a requirement that before a new software version of the aggregator brought into the processing set, the metrics processed by the new aggregator node should be verified against the aggregated metrics processed by an existing aggregator node. To achieve this each aggregator is give a state—ACTIVE or SHADOW. All metrics aggregated by the ACTIVE nodes would be available as final metric aggregation result and will be available for querying by the reader nodes. The metrics aggregated by the SHADOW nodes would be stored in shadow storage and would not be visible to the querying side. The collector nodes would send metrics to both ACTIVE and SHADOW nodes simultaneously, based on the consistent hashing routing mechanism. The ACTIVE and SHADOW node would both aggregate the same data and would persist the results in the active and shadow storage system accordingly.

Figure 1:
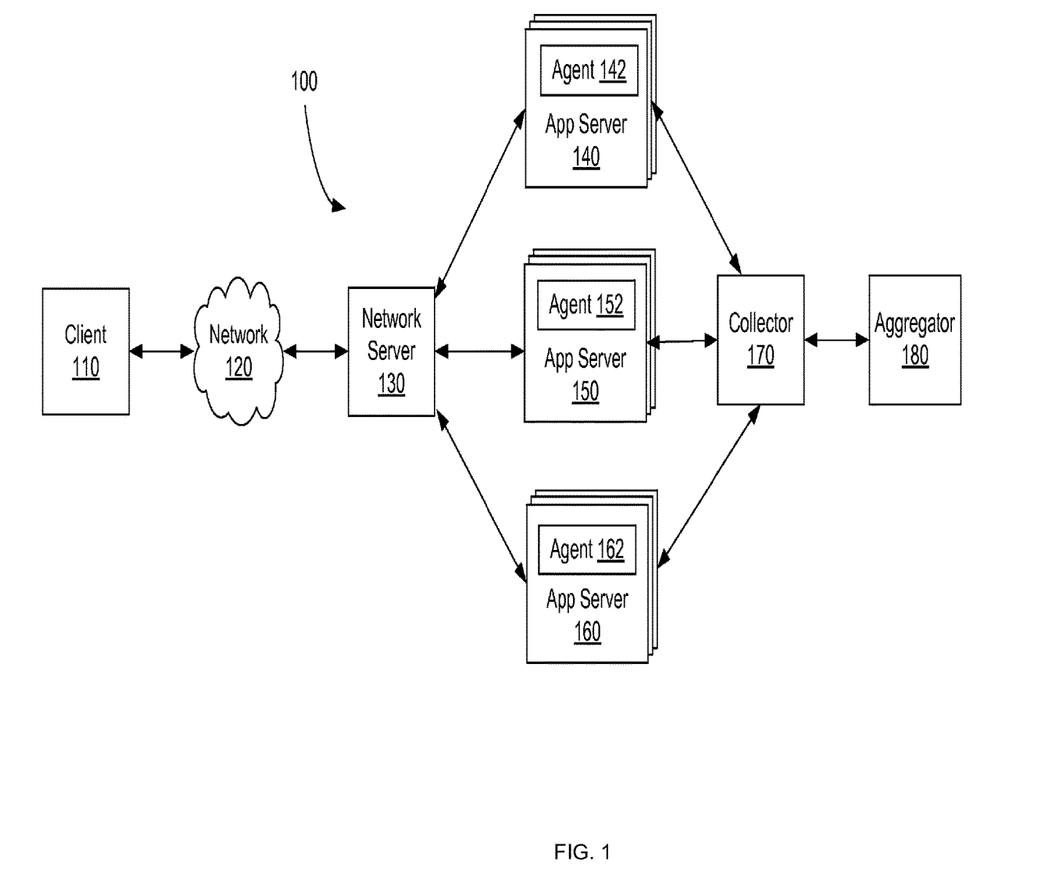
FIG. 1 is a block diagram of a system for aggregating data.

FIG. 1 is a block diagram of a system for aggregating data. The system of FIG. 1 includes client 110, network server 130, application servers 140, 150 and 160, collector 170 and aggregator 180. Client 110 may send requests to and receive responses from network server 130 over network 120. In some embodiments, network server 130 may receive a request, process a portion of the request and send portions of the request to one or more application servers 140-150. Application server 140 includes agent 142. Agent 142 may execute on application server 140 and monitor one or more functions, programs, modules, applications, or other code on application server 140. Agent 142 may transmit data associated with the monitored code to a collector 170. Application servers 150 and 160 include agents 152 and 162, respectively, and also transmit data to collector 170.

Collector 170 may receive metric data and provide the metric data to one or more aggregators 180. Collector 170 may include one or more collector machines, each of which using a logic to transmit metric data to an aggregator 180 for aggregation. Aggregator 180 aggregates data and provides the data to a cache for reports to external machines. The aggregators may operation in a ring, receiving metric data according to logic that routes the data to a specific aggregator. Each aggregator may, in some instances, register itself with a presence server.

Figure 2A:
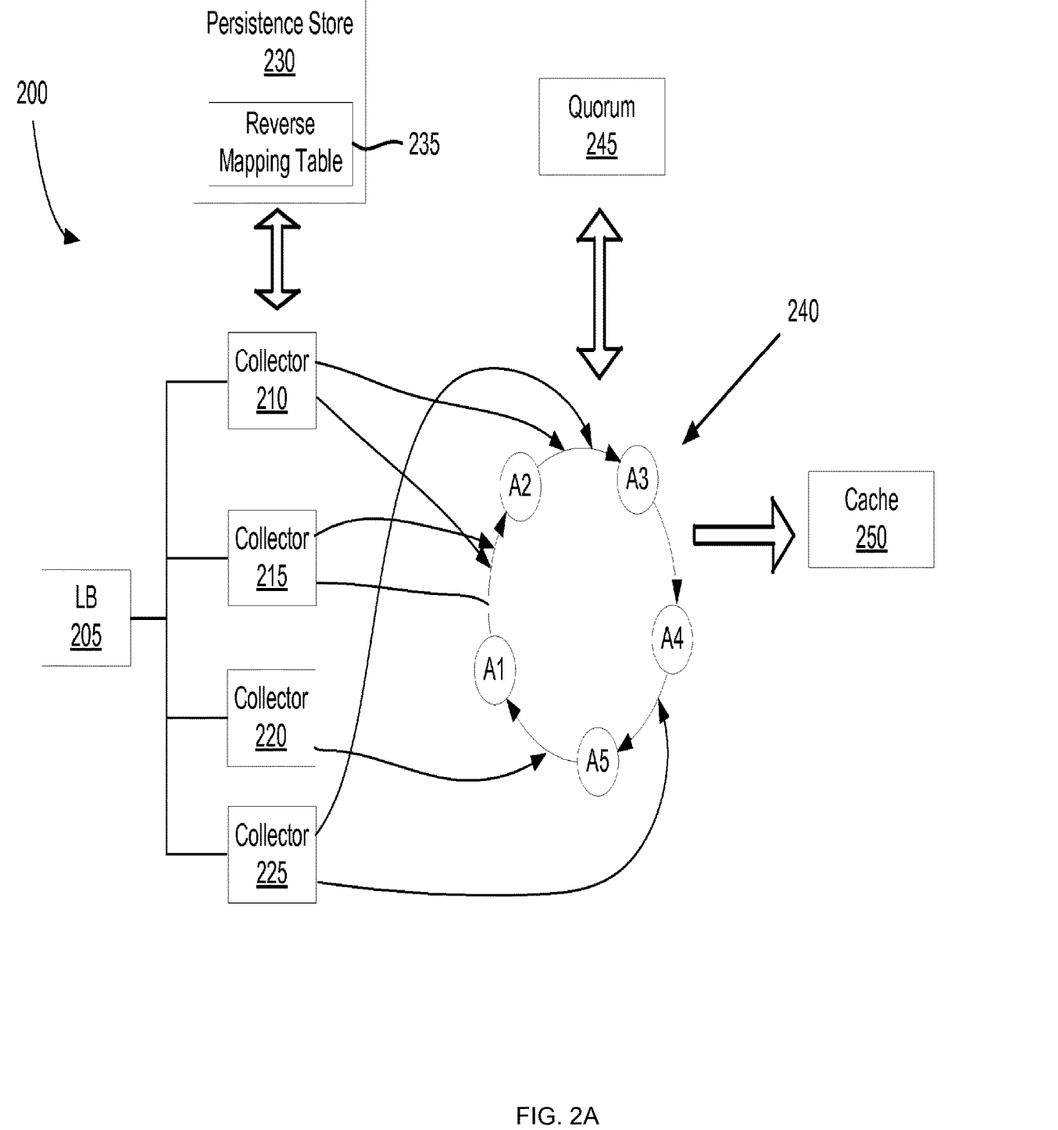
FIG. 2A is a block diagram of a collector and aggregator.

FIG. 2A is a block diagram of a collector and aggregator. The system of FIG. 2 includes load balancer 205, collectors 210, 215, 220 and 225, a persistence store 235, and aggregators 240 (A1-A5). The system of FIG. 2 also includes quorum 245 and cache 250. Agents on application servers may transmit metric data to collectors 210-225 through load balance machine 205. In some embodiments, the metrics are sent from the agent to a collector in a table format for example once per minute.

The collectors receive the metrics and use logic to route the metrics to aggregators. The logic may include determining a value based on information associated with the metric, such as a metric identifier. In some instances, the logic may include performing a hash on the metric ID. The metric may be forwarded to the aggregator based on the outcome of the hash of the metric ID. The same hash is used by each and every collector to ensure that the same metrics are provided to the same aggregator.

The collectors may each register with quorum 245 when they start up. In this manner, the quorum may determine when one or more collectors is not performing well and/or fails to register.

A persistence store stores metric data provided from the collectors to the aggregators. A reverse mapping table may be used to associate data with a metric such that when an aggregator fails, the reverse mapping table may be used to replenish a new aggregator with data associated with the metrics that it will receive.

Each aggregator may receive one or more metric types, for example two or three metrics. The metric information may include a sum, count, minimum, and maximum value for the particular metric. An aggregator may receive metrics having a range of hash values. The same metric type will have the same hash value and be routed to the same aggregator. An aggregator may become a coordinator. A coordinator may check quorum data and confirm persistence was successful.

Once aggregated, the aggregated data is provided to a cache 250. Aggregated metric data may be stored in cache 250 for a period of time and may eventually be flushed out. For example, data may be stored in cache 250 for a period of eight hours. After this period of time, the data may be overwritten with additional data.

Figure 2B:
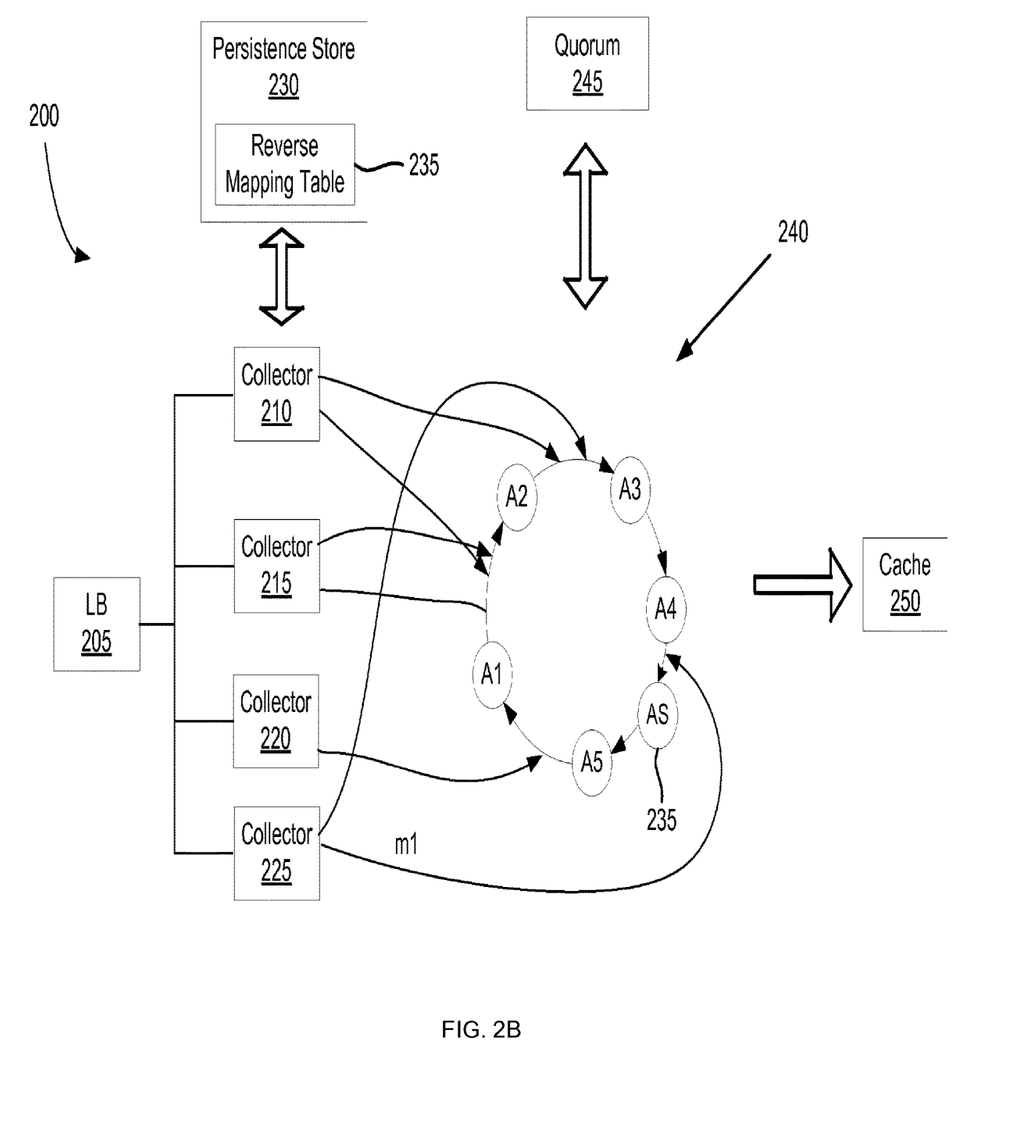
FIG. 2B is a block diagram of a collector and aggregator with a shadow aggregator.

FIG. 2A is a block diagram of a collector and aggregator with a shadow aggregator. Shadow aggregator 235 (AS) is logically located between aggregators A4 and A5. When a metric is transmitted from a collector and intended to be received by aggregator A5, for example metric m1 sent from collector 225, the metric may first be received by AS. The AS will receive the metric, process the metric and store the metric data, and pass the metric to aggregator A5. AS, an aggregator with a shadow state, ultimately passes the metric to active node AS due to the "shadow" state setting of AS. Because AS has a state set to 'active', AS will process and store the metric rather than pass the metric any further.

Figure 3:
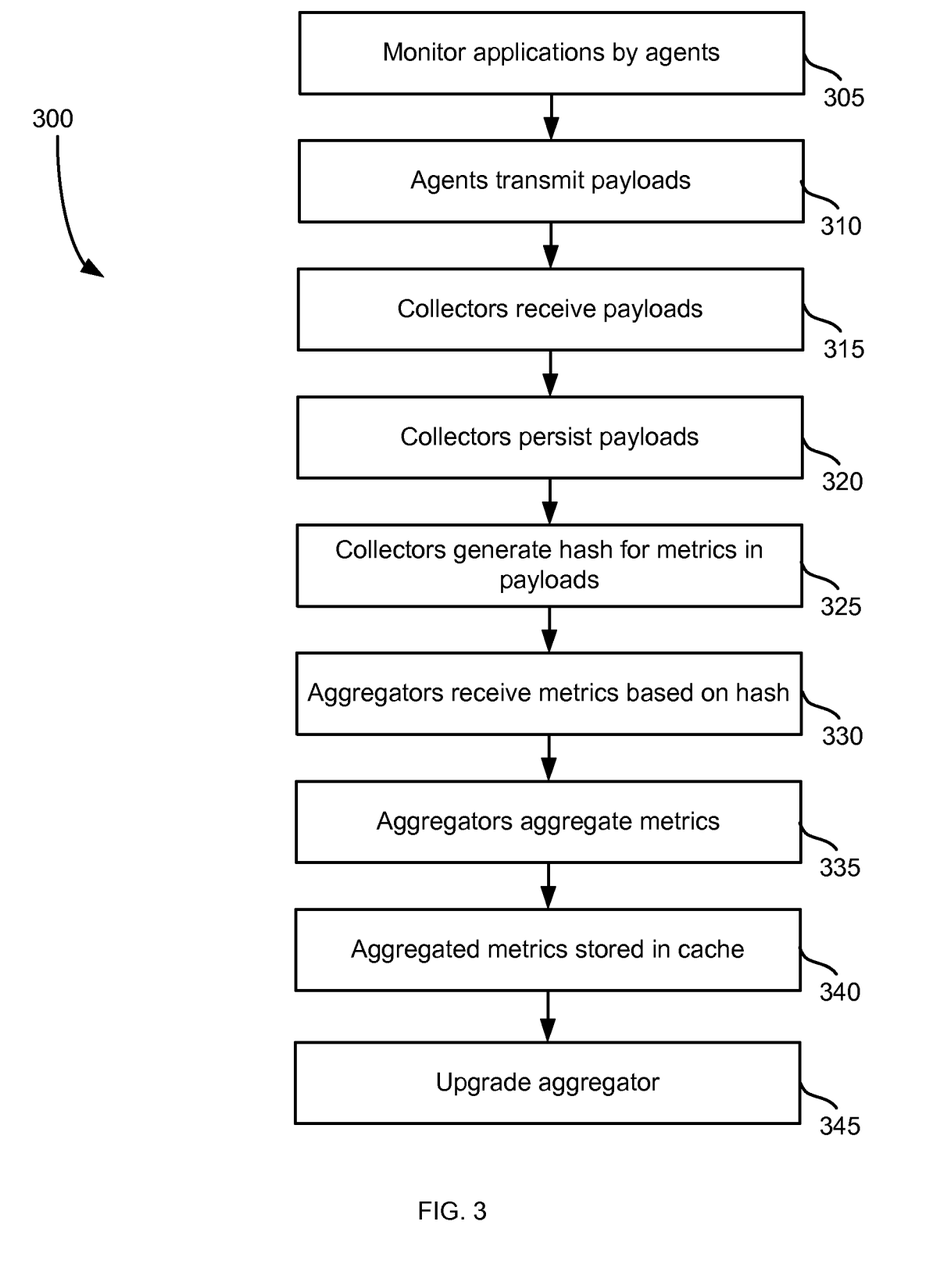
FIG. 3 is a method for processing metrics.

FIG. 3 illustrates a method for processing metrics. First, applications are monitored by agents at step 305. The agents may collect information from applications and generate metric data. The agents may then transmit payloads to one or more collectors at step 310. The payloads may include metric information associated with the applications and other code being monitored by the particular agent. The payloads may be sent periodically from a plurality of agents to one or more collectors.

One or more collectors may receive the payloads at step 315. In some embodiments, a collector may receive an entire payload from an agent. The collectors persist the payload at step 320. To persist the payload, a collector may transmit the payload to a persistence store 230.

A collector may generate a hash for metric data within the payload at step 325. For example, for each metric, the collector may perform a hash on the metric type to determine a hash value. The same hash is performed on each metric by each of the one or more collectors. The metrics may then be transmitted by the collectors to a particular aggregator based on the hash value. Forwarding metric data to a particular aggregator of a plurality of aggregator is an example of the consistent logic that may be used to route metric data to a number of aggregators. Other logic to process the metric data may be used as well as long as it is the same logic applied to each and every metric.

The aggregators receive the metrics based on the hash value at step 330. For example, each aggregator may receive metrics having a particular range of hash values, the next aggregator may receive metrics having a neighboring range of hash values, and so on until a ring is formed by the aggregators to handle all possible hash values.

The aggregators then aggregate the metrics at step 335. The metrics may be aggregated to determine the total number of metrics, a maximum, a minimum, and average value of the metric. The aggregated metrics may then be stored in a cache at step 340. A controller or other entity may retrieve the aggregated metrics from the cache for a limited period of time.

An aggregator may be upgraded at step 345. At any time during data collection and aggregation, an aggregator node may need to be updated. When appropriate, the aggregator may be updated in such a way as to have no system downtime, eliminate data loss, experience live-data verification, and provide dynamic node upgrades between states. Upgrading an aggregator may involve introducing a new aggregator having a shadow state. The state of the aggregator may be set to active once a data-based verification process has taken place. Upgrading an aggregator is discussed in more detail with respect to FIGS. 4-6.

Figure 4:
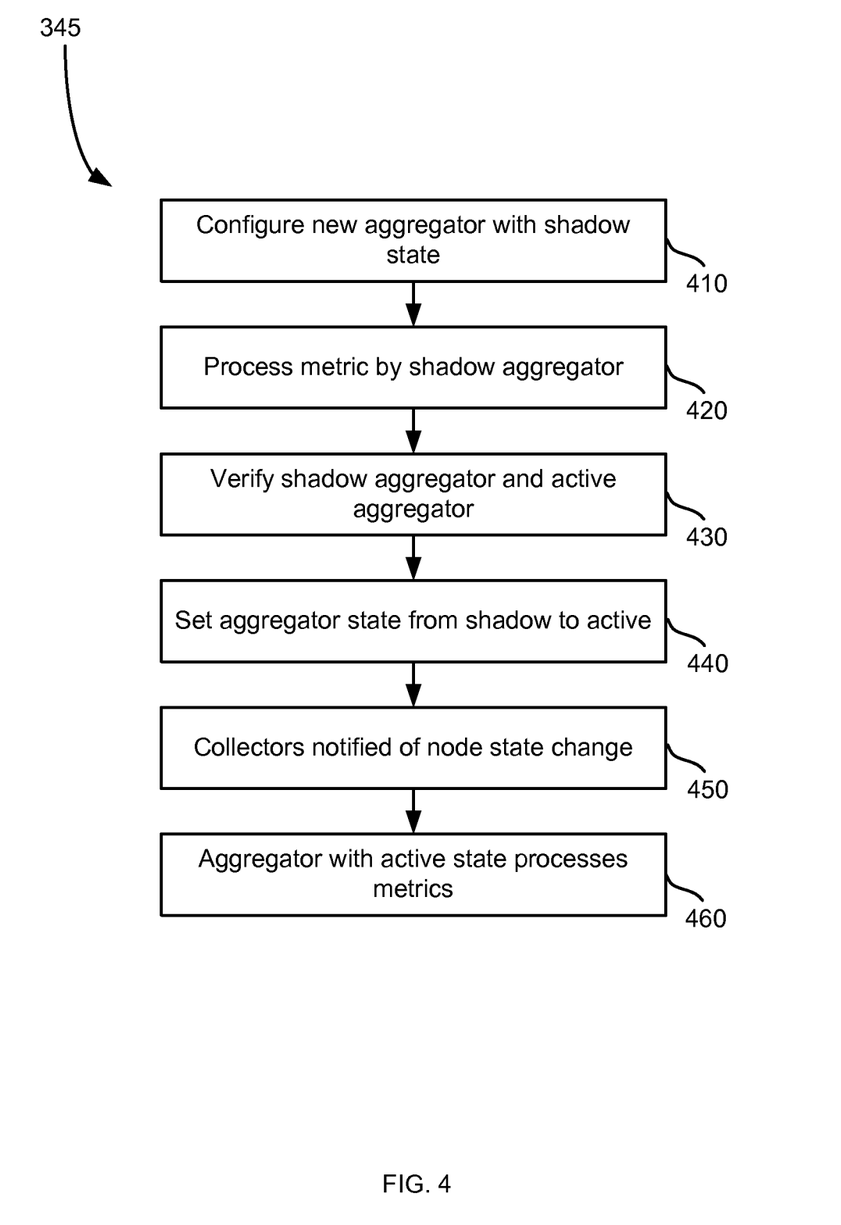
FIG. 4 is a method for upgrading an aggregator.

FIG. 4 is a method for upgrading an aggregator. The method of FIG. 4 provides more detail for step 345 of the method of FIG. 3. A new aggregator may be configured with a shadow state at step 410. Configuring the aggregator may include building a new aggregator object and providing the object with a configuration file. Configuring a new aggregator is discussed in more detail with respect to the method of FIG. 5.

Metrics may be processed by the shadow aggregator at step 420. Once the aggregator with a shadow state is configured, the shadow aggregator may start processing data. When a shadow aggregator receives a metric for processing, the metric may be processed, stored and then passed to the next active aggregator. Processing metrics by the shadow aggregator is discussed in more detail with respect to the method of FIG. 6.

A shadow aggregator and active aggregator are verified at step 430. The verification may include determining the data stored by each of the shadow aggregator and the active aggregator which received the data forwarded by the shadow aggregator are the same. If the data stored by the two aggregators is the same, the shadow aggregator verification is successful and the method continues. If the data for the two aggregators does not match, the verification fails and the aggregator having a shadow state is not transitioned to active state.

Once the verification is successful, the aggregator state is set from shadow to active at step 440. Collectors are notified of the new active aggregator at step 450. Collectors may be notified as a result of listening to a directory that includes information for each aggregator and aggregator changes. When the state value is set (and changes), each collector may detect the change as well as the newly active aggregator host and port information included in the directory. In some instances, the collectors may be notified in some other manner. The newly active aggregator may process data as other active aggregators at step 460.

Figure 5:
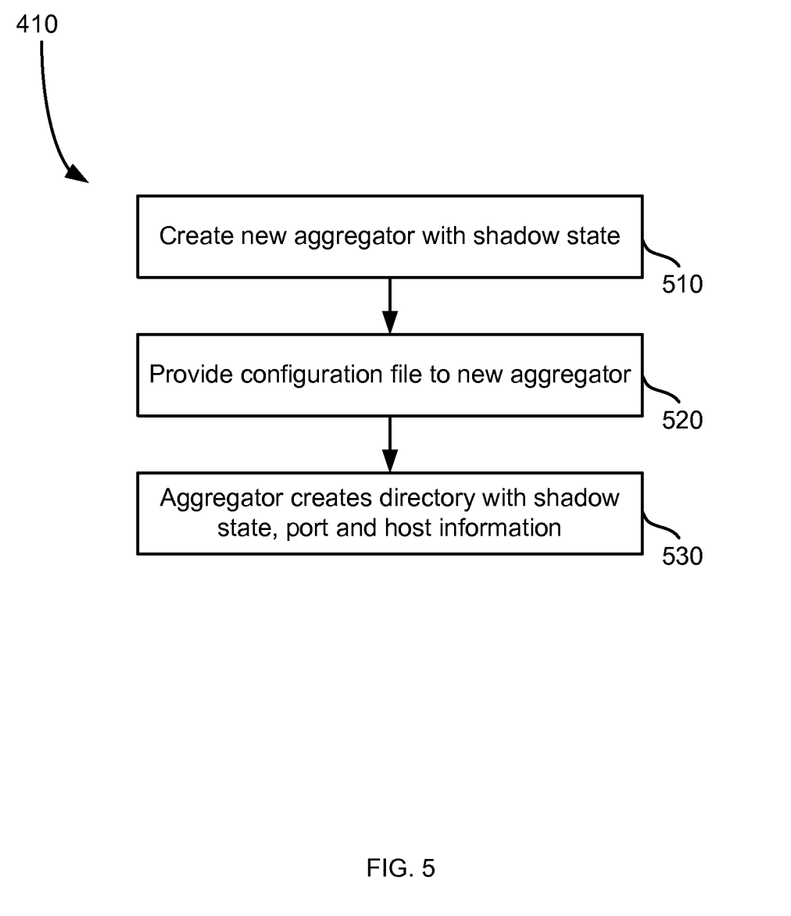
FIG. 5 is a method for configuring a new aggregator with a shadow state.

FIG. 5 is a method for configuring a new aggregator with a shadow state. The method of FIG. 6 may provide more detail for step 410 of the method of FIG. 4. First, a new aggregator with a shadow state is created at step 510. The new aggregator may be created as an object or other module. A configuration file is provided to the new shadow aggregator at step 520. The configuration file may indicate the aggregator status if not already known, a location of a directory in which the aggregator should list itself, the aggregator host and port information that will be passed onto collectors once the aggregator is active, and other data. The aggregator then creates a directory listing with the shadow state, port and host data at step 530.

Figure 6:
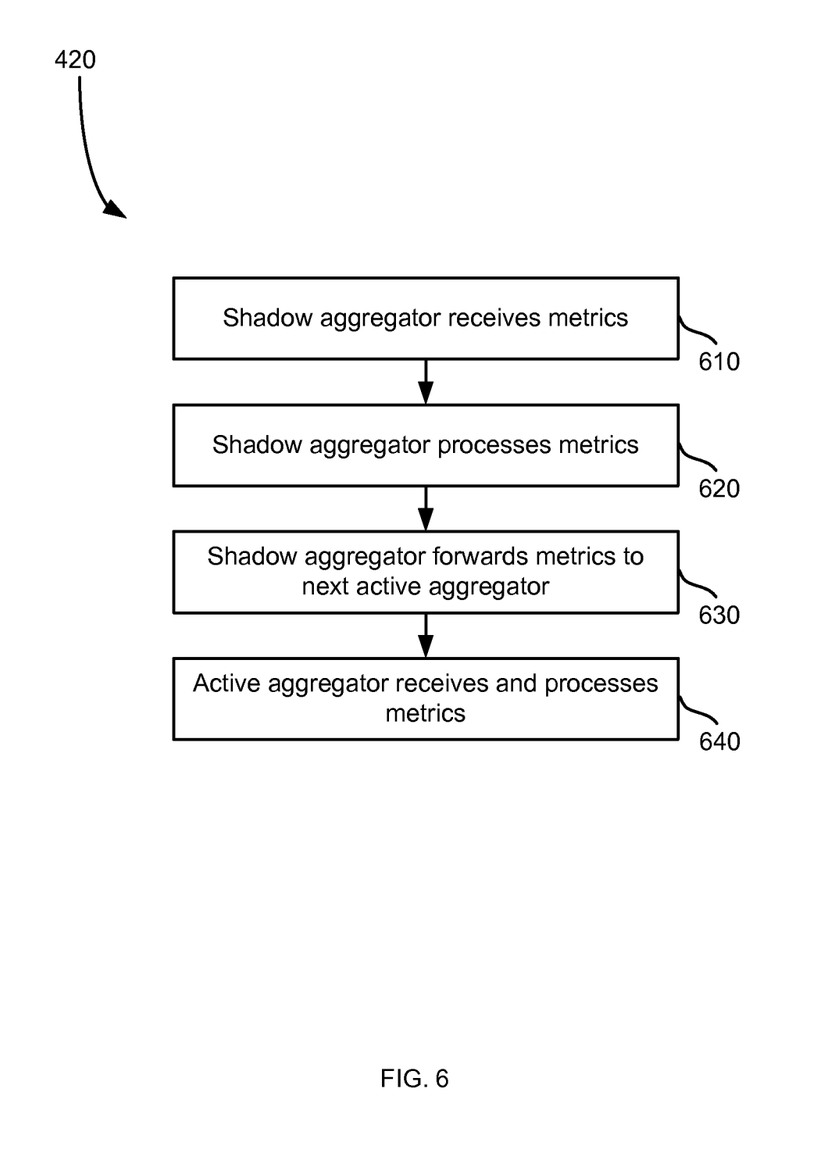
FIG. 6 is a method for processing a metric by a shadow aggregator.

FIG. 6 is a method for processing a metric by a shadow aggregator. The method of FIG. 6 provides more detail for step 420 in the method of FIG. 4. A shadow aggregator receives metrics at step 610. The metrics are transmitted by one or more collectors. The shadow aggregator processes the metrics at step 620. Processing may include aggregating the metric data, which may include a maximum, minimum, count and sum data. The shadow aggregator may forward the aggregated metrics to the next active aggregator at step 630. A shadow aggregator will forward all received metrics to the next active aggregator. For example, in FIG. 2B, the next active aggregator for shadow aggregator AS is aggregator A5. The active aggregator receives the metrics from the shadow aggregator and processes the metrics at step 640. The active aggregator will process and store the metrics in the same way the shadow aggregator is supposed to, such that a verification of the stored data for both aggregators will result in confirmation that the stored data is the same.

Figure 7:
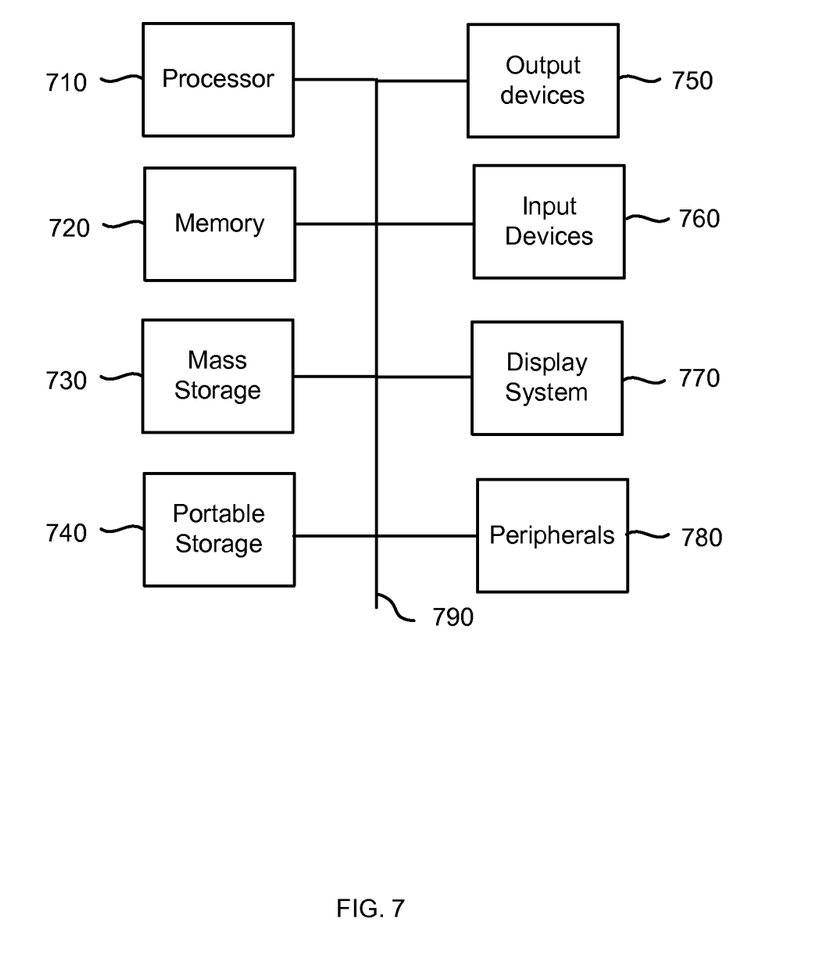
FIG. 7 is a block diagram of a system for implementing the present technology.

FIG. 7 is a block diagram of a computer system for implementing the present technology. System 700 of FIG. 7 may be implemented in the contexts of the likes of client 110, network server 130, application servers 140-160, collectors 170 and aggregators 180. A system similar to that in FIG. 7 may be used to implement a mobile device, such as a smart phone that provides client 110, but may include additional components such as an antenna, additional microphones, and other components typically found in mobile devices such as a smart phone or tablet computer.

The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 700 of FIG. 7 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for performing aggregator verification during an upgrade, comprising:
    configuring a processing state of a new aggregator in a computer network to be in a shadow state when an upgrade to a particular aggregator of a plurality of aggregators is required, wherein, in the shadow state, metrics aggregated by a shadow aggregator are stored but not visible to reader nodes;
    receiving, at the new aggregator, time series payload data destined for the particular aggregator, wherein the time series payload data is a) associated with a metric and b) routed to the new aggregator using a hash value, wherein the hash value is output of a hash of a metric identifier associated with the metric or output of a hash of a metric type of the metric;
    processing and storing, by the new aggregator, the time series payload data;
    forwarding, by the new aggregator, the time series payload data to the particular aggregator, the particular aggregator configured to be in an active state, wherein, in the active state, metrics aggregated by an active aggregator are stored and final aggregations results are available to the reader nodes;
    verifying, by determining whether that the processed time series payload data stored by the new aggregator and processed time series payload data stored by the particular aggregator are the same; and
    in response to the verifying:
        if the processed time series payload data stored by the new aggregator and processed time series payload data stored by the particular aggregator are the same, the shadow aggregator verification is successful and the processing state of the new aggregator is modified from the shadow state to the active state, wherein the new aggregator in the active state processes and stores newly received payload data without forwarding the newly received payload data to the particular aggregator;
        if the processed time series payload data stored by the new aggregator and processed time series payload data stored by the particular aggregator does not match, the verification fails and the processing state of the new aggregator is not modified from the shadow state to the active state,
        wherein the new aggregator continues to forward additional payload data to the particular aggregator until the verification is successful, and
        wherein, prior to the verifying, the new aggregator is kept in the shadow state and continues to forward additional payload data to the particular aggregator.

2. The method of claim 1, wherein the new aggregator is an updated version of the particular aggregator.

3. The method of claim 1, further comprising:
    receiving time series data metrics by the plurality of aggregators from one or more collectors configured to transmit time series metrics to the new aggregator after the verification is successful.

4. The method of claim 1, further comprising:
    processing and storing time series payload data by two or more new aggregators, wherein each of the two or more new aggregators pass the received time series payload data towards the particular aggregator.

5. The method of claim 1, wherein the metric aggregation is multi-tenant based aggregation.

6. A non-transitory computer readable storage medium having embodied thereon a program, the program being executable by a processor to execute a method for performing aggregator verification during an upgrade, the method comprising:
    configuring a processing state of a new aggregator in a computer network to be in a shadow state when an upgrade to a particular aggregator of a plurality of aggregators is required, wherein, in the shadow state, metrics aggregated by a shadow aggregator are stored but not visible to reader nodes;
    receiving, at the new aggregator, time series payload data destined for the particular aggregator, wherein the time series payload data is a) associated with a metric and b) routed to the new aggregator using a hash value, wherein the hash value is output of a hash of a metric identifier associated with the metric or output of a hash of a metric type of the metric;

processing and storing, by the new aggregator, the time series payload data;

forwarding, by the new aggregator, the time series payload data to the particular aggregator, the particular aggregator configured to be in an active state, wherein, in the active state, metrics aggregated by an active aggregator are stored and final aggregations results are available to the reader nodes;

verifying, by determining whether that the processed time series payload data stored by the new aggregator and processed time series payload data stored by the particular aggregator are the same; and in response to the verifying:
- if the processed time series payload data stored by the new aggregator and processed time series payload data stored by the particular aggregator are the same, the shadow aggregator verification is successful and the processing state of the new aggregator is modified from the shadow state to the active state, wherein the new aggregator in the active state processes and stores newly received payload data without forwarding the newly received payload data to the particular aggregator,
- if the processed time series payload data stored by the new aggregator and processed time series payload data stored by the particular aggregator does not match, the verification fails and the processing state of the new aggregator is not modified from the shadow state to the active state,
- wherein the new aggregator continues to forward additional payload data to the particular aggregator until the verification is successful, and
- wherein, prior to the verifying, the new aggregator is kept in the shadow state and continues to forward additional payload data to the particular aggregator.

7. The non-transitory computer readable storage medium of claim 6, wherein the new aggregator is an updated version of the particular aggregator.

8. The non-transitory computer readable storage medium of claim 6, the method further comprising:
receiving time series data metrics by the plurality of aggregators from one or more collectors configured to transmit time series metrics to the new aggregator after the verification is successful.

9. The non-transitory computer readable storage medium of claim 6, the method further comprising:
processing and storing time series payload data by two or more new aggregators, wherein each of the two or more new aggregators pass the received time series payload data towards the particular aggregator.

10. A system for performing aggregator verification during an upgrade, the system comprising:
a processor;
a memory; and;
one or more modules stored in memory and executable by a processor to:
configure a processing state of a new aggregator in a computer network to be in a shadow state when an upgrade to a particular aggregator of a plurality of aggregators is required, wherein, in the shadow state, metrics aggregated by a shadow aggregator are stored but not visible to reader nodes;

receive, at the new aggregator, time series payload data destined for the particular aggregator, wherein the time series payload data is a) associated with a metric and b) routed to the new aggregator using a hash value, wherein the hash value is output of a hash of a metric identifier associated with the metric or output of a hash of a metric type of the metric;

process and store, by the new aggregator, the time series payload data;

forward, by the new aggregator, the time series payload data to the particular aggregator, the particular aggregator configured to be in an active state, wherein, in the active state, metrics aggregated by an active aggregator are stored and final aggregations results are available to the reader nodes;

verify, by determining whether that the processed time series payload data stored by the new aggregator and processed time series payload data stored by the particular aggregator are the same; and in response to the verifying:
- if the processed time series payload data stored by the new aggregator and processed time series payload data stored by the particular aggregator are the same, the shadow aggregator verification is successful and the processing state of the new aggregator is modified from the shadow state to the active state, wherein the new aggregator in the active state processes and stores newly received payload data without forwarding the newly received payload data to the particular aggregator,
- if the processed time series payload data stored by the new aggregator and processed time series payload data stored by the particular aggregator does not match, the verification fails and the processing state of the new aggregator is not modified from the shadow state to the active state,
- wherein the new aggregator continues to forward additional payload data to the particular aggregator until the verification is successful, and
- wherein, prior to the verifying, the new aggregator is kept in the shadow state and continues to forward additional payload data to the particular aggregator.

11. The system of claim 10, wherein the new aggregator is an updated version of the particular aggregator.

12. The system of claim 10, wherein the one or more modules stored in memory and executable by the processor to further:
receive time series data metrics by the plurality of aggregators from one or more collectors configured to transmit time series metrics to the new aggregator after the verification is successful.

13. The method of claim 1, wherein the time series payload data is simultaneously routed to the particular aggregator using the hash value.

14. The system of claim 10, wherein the time series payload data is simultaneously routed to the particular aggregator using the hash value.

* * * * *